United States Patent [19]

Suo

[11] 4,258,780
[45] Mar. 31, 1981

[54] DUAL CYCLE HEAT PIPE-METHOD AND APPARATUS

[75] Inventor: Mikio Suo, Ellington, Conn.

[73] Assignee: United Technologies Corporation, Hartford, Conn.

[21] Appl. No.: 972,598

[22] Filed: Dec. 22, 1978

[51] Int. Cl.³ .................... F25B 27/02; F25B 13/00
[52] U.S. Cl. ................................ 165/2; 62/260; 62/435; 62/333; 165/45; 165/105; 62/238.6
[58] Field of Search .................... 165/45, 105, 2; 62/238 E, 260, 324, 333, 435

[56] References Cited

U.S. PATENT DOCUMENTS

| 2,749,724 | 6/1956 | Borgerd et al. | 165/45 X |
| 2,780,415 | 2/1957 | Gay | 165/105 X |
| 3,563,304 | 2/1971 | McGrath | 165/45 X |
| 4,042,012 | 8/1977 | Perry et al. | 165/45 X |

Primary Examiner—Albert W. Davis
Attorney, Agent, or Firm—Harry J. Gwinnell

[57] ABSTRACT

A method and apparatus for utilizing the earth or other heat source/heat sink for heating and cooling buildings are disclosed. The system comprises at least one heat transfer fluid conduit and at least one heat pipe in heat transfer communication. When two conduits are employed a dual cycle system for heating and cooling is disclosed. In the preferred embodiment, upper and lower heat transfer fluid conduits containing a first heat transfer fluid are connected by heat pipes containing a second heat transfer fluid, the two fluids being isolated from one another. The heat pipes are preferably sealed plastic tubes with hollow metal end caps at each end. The metal end caps on the heat pipes are positioned in the circulation pipes so as to have sufficient contact with the recirculatory fluid in the respective heat transfer fluid conduits to transfer heat to and from such fluid. In the summer, heated fluid flows through the lower conduit causing the second heat transfer fluid in the lower end cap of the heat pipe to boil and condense on the heat pipe wall giving off heat to the ground or other heat sink, thereby providing a cooling action on the first heat transfer fluid flowing through the lower conduit. In winter, the lower conduit is shut down and the upper conduit activated by passing cooled first heat transfer fluid through the upper conduit which condenses the second heat transfer fluid in the upper end cap causing it to flow by gravity down the walls of the heat pipe to a point at which it boils and the resulting vapor then goes back up the heat pipe as a vapor, repeating the cycle and resulting in the heating of the first heat transfer fluid in the upper conduit. Such a system can be used to both heat and cool buildings.

17 Claims, 5 Drawing Figures

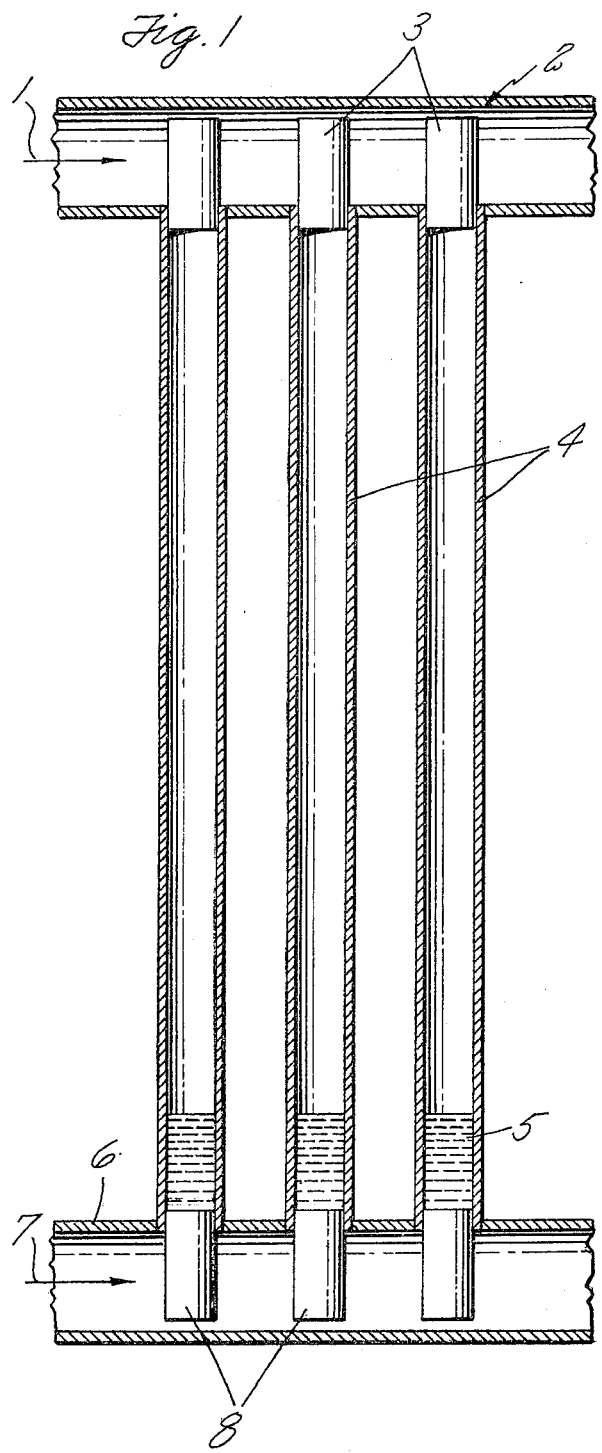
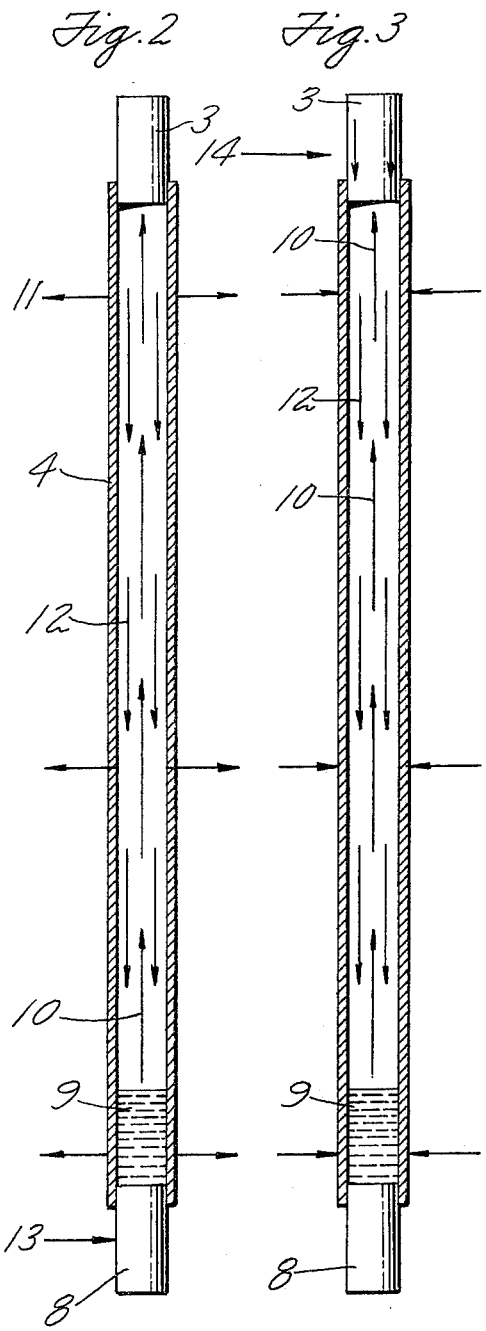

DUAL CYCLE HEAT PIPE-METHOD AND APPARATUS

CROSS REFERENCE TO RELATED APPLICATIONS

Attention is directed to Ser. No. 972,599, of common assignee, filed of even date herewith, entitled "Heat Pipe Bag System" which teaches a method of heating and cooling buildings through the use of a heat pipe system.

BACKGROUND OF THE INVENTION

1. Field of the Invention

The field of art to which this invention pertains is heat exchange utilizing an intermediate fluent material for receiving and discharging heat based on a condensing and evaporating system.

2. Description of the Prior Art

It has been proposed to utilize a heat pipe system to provide heating and cooling to residential buildings and other similar structures. For example, the use of heat pipes in conjunction with furnace, hot water, and fireplace systems has been suggested (*Heat Pipe Theory And Practice*, by S. W. Chi, p. 219). It has also been proposed to use the relatively constant temperature of the earth as a source of heating and cooling with various heat pipe systems. For example, U.S. Pat. No. 4,042,012 discloses a heat pump-heat pipe system utilizing the earth as the heat source and heat sink with heat pipes buried in a hole and surrounded by water-soaked absorbent polymer particles; U.S. Pat. No. 2,749,724 utilizes a heat pump and coil arrangement to take advantage of the earth's temperature constant to heat a residential dwelling; and U.S. Pat. No. 3,563,304 discloses a heat exchange system for providing refrigeration to a building structure where part of the heat exchange system may be buried in the ground.

However, what has been lacking in the prior art is an efficient method of utilizing the stored heat in the earth or other heat source/heat sink in a heat exchange system which is both efficient and yet relatively simple in structure to make its use economically feasible.

BRIEF SUMMARY OF THE INVENTION

The present invention overcomes the difficulties in utilizing the constant temperatures of a relatively constant temperature heat source/heat sink such as the earth for heating and cooling buildings in conjunction with conventional heat pumps and further overcomes the generally low thermal conductivity of the ground which requires an extensive distribution or collection system in the prior art. According to the present invention, a dual cycle, gravity driven heat pipe of simple operation and design is described to distribute heat to or collect heat from the ground. The heat transfer system described comprises at least one of an upper or lower heat transfer fluid conduit having attached thereto at least one gravity driven heat pipe to operate on a first heat transfer fluid which passes through the conduit. The gravity driven heat pipe contains a second heat transfer fluid. The interior of the conduit is in heat transfer communication with the heat pipes and the interiors of the heat pipes and conduits are in fluid isolation from each other. In the dual cycle embodiment, both upper and lower first heat transfer fluid conduits are presently connected by common heat pipes and either an air-conditioning or heating mode can be effected by simply limiting the flow of the first heat transfer fluid to either the lower or upper conduit, respectively. In conjunction with conventional heat pump apparatus, the use of such systems can realize substantial savings in costs of heating and cooling building structures.

The foregoing and other objects, features and advantages of the present invention will become more apparent in light of the following detailed description of preferred embodiments thereof as discussed and illustrated in the accompanying drawings.

BRIEF DESCRIPTION OF THE DRAWINGS

FIG. 1 is a vertical section of a heat pipe-circulation pipe system of the present invention.

FIG. 2 is a vertical section of the heat pipe demonstrating its cooling cycle.

FIG. 3 is a vertical section of the heat pipe demonstrating its heating cycle.

DESCRIPTION OF THE PREFERRED EMBODIMENT

Figure 4:
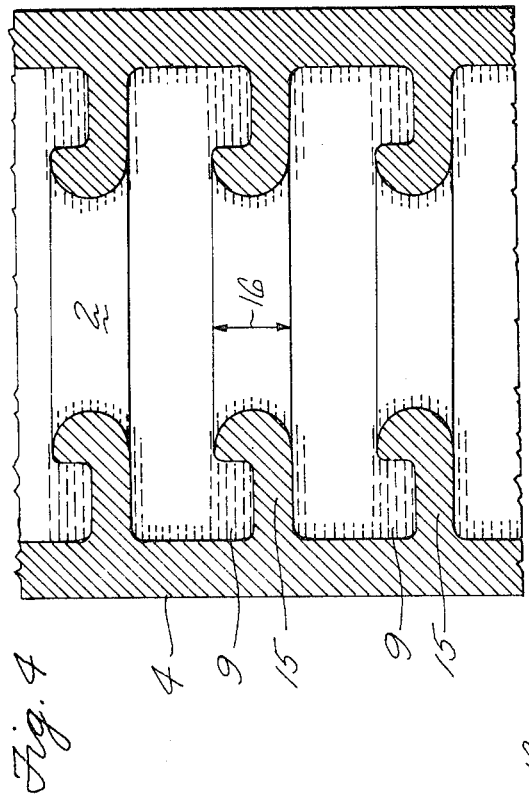
FIG. 4 demonstrates a preferred embodiment of the internal condensation surface of the heat pipe.

Exemplary apparatus demonstrating the instant invention comprises upper and lower circulation pipes connected by heat pipes. The heat pipes are preferably plastic but can be metal or any other material which can withstand prolonged below ground exposure. While a variety of designs are possible, it is of course critical that the interior of the first heat transfer fluid conduit be in heat transfer communication with the heat pipes. While a variety of designs are possible to accomplish this end, tubular heat pipes with sealed heat transfer ends extending into the fluid conduits are preferred. Such heat transfer surfaces present at the ends of the heat pipes, will function as boilers and condensers. As stated, in the preferred form the heat transfer surfaces of the heat pipes extend at least partway into the circulation pipes. If the heat pipes are, for example, metal the heat pipe ends can be a mere extension of the material the heat pipe is composed of. But, if plastic or other less conductive material is used, then a composite end cap arrangement is preferred.

The heat pipe ends can be the same or different material at each end and can be of almost any usable shape. While the cup shape is preferred, finned or other similar design is also possible. The heat pipe ends and plastic pipe represent a closed, sealed system filled with the liquid and vapor of a second heat transfer fluid. It is important that the interior of the first heat transfer fluid conduit be in fluid isolation from the interior of the heat pipe, and the seal end cap arrangement above accomplishes this. As stated, the heat pipe ends or end caps preferably extend into the circulation pipes on either end of the preferred plastic heat pipes where the ultimate first heat transfer fluid passes and contacts and are at least partially covered by the first heat transfer fluid in the circulation pipes. In most operating instances the first heat transfer fluid will substantially fill the circulation pipes as it passes through the heating or cooling system. So in most cases even slight intrusion of the metal end caps of the heat pipes into the circulation pipes will be sufficient to cause the necessary heat transfer for an efficient apparatus and method. However, the degree of intrusion of the end caps into the heat pipe will depend on a number of factors such as flow rates, specific first heat transfer fluid heat transfer properties, etc., calculable by one skilled in this area. Preferably, the end caps will be of sufficient length so as to extend almost completely into the entire diameter of the recirculation pipe. Note, e.g., FIG. 1.

In the air-conditioning cycle, the upper circulation pipe would be closed off and the first heat transfer fluid from the heat pump unit would flow through the lower circulation pipe transferring heat from the first heat transfer fluid to the second heat transfer fluid through the lower metal end cap functioning in its boiler capacity. The second heat transfer fluid thus heated would boil and the vapor would rise in the plastic tube. The vapor would condense on the walls of the heat pipes transferring the heat from the second heat transfer fluid to the ground or other heat sink. The thus cooled vapor would flow as a liquid by gravity alone back to the lower end cap functioning as a boiler to extract more heat from the first heat transfer fluid in the air-conditioning cycle. The thus cooled first heat transfer fluid would pass back to the air-conditioning system providing cool air to the residential dwelling or other building structure and once extracting warmth from the air in the dwelling would continue once again through the lower circulation pipe and continue the cycle.

In the heating cycle, the lower circulation pipe would be closed off and the first heat transfer fluid would pass through the upper circulation pipe in the system. The first heat transfer fluid in the upper pipe would be at such a temperature to cause condensation of the vapors on the upper metal end cap functioning as a condenser thus forming a liquid from the second heat transfer vapors and extract heat from the second heat transfer fluid vapors. The second heat transfer fluid liquid thus formed by condensation would flow by gravity down the walls of the heat pipe. As the condensate flows down the walls of the heat pipes, it would boil by virtue of the residual heat within the earth. The resulting vapor would go back up the heat pipe as a vapor and recondense on the upper metal end cap functioning as a condenser as a result of the heat and energy extracted from the vapor by virtue of the cooled upper metal end caps, cooled by the first heat transfer fluid passing through the upper circulation pipe. The warmed first heat transfer fluid passing by the upper metal end cap would return to a heat pump providing warmth to heat the building structure.

As shown in FIG. 1, the invention basically comprises a system of circulation pipes and heat pipes of simple and efficient design, the essence of which is gravity driven. The system is a dual cycle system being capable of supplying a low temperature heat sink for a heat pump unit operating in an air-conditioning mode and a source of heating for a heat pump operating in a heating mode to provide an aid to both the heating and cooling of building structures such as residential dwellings. In FIG. 1, the first heat transfer fluids 1 and 7 which can be any fluid capable of transferring heat but preferably a liquid such as water or a waterethylene glycol mixture (preferably 50% water, 50% ethylene glycol, by volume) passes through the respective circulation pipes 2 and 6 contacting either lower metal end caps functioning as boilers 8 or upper metal end caps 65 functioning as condensers 3 transferring heat to or from the second heat transfer fluids 5 in plastic heat pipes 4. The recirculation pipes 2 and 6 may be any diameter and size to accomplish the purposes of the invention and would be well within the purview of one skilled in this art. The circulation pipes may be any suitable material to convey the first heat transfer fluid such as metal or plastic. Similarly, the metal end caps functioning as condensers and boilers may be any metal suitable for such use provided they have such properties as resistance to corrosion to the heat transfer fluids and high thermal conductivity, such as aluminum or copper. Preferably the metal end caps are hollow, tubular shaped pieces with metal seals at the ends, resembling metal cups and secured to plastic heat pipes forming a closed, sealed system. While the preferred configuration of the end caps is sealed, hollow and tubular, as noted above other configurations may be used. The cup or cap shape of the boilers and condensers in the preferred heat pipe provides for an improved heat transfer surface. For example, the second heat transfer fluid liquid condensing in the heat pipe can collect in the bottom of the end cap in a small pool and receive heat from the bottom and sides of the end cap simultaneously, providing for more efficient heat transfer than for example, a solid metal cylindrical end cap. But if for any particular consideration other shapes would be desired, solid, plate-shaped or any workable design would be acceptable as long as the particular design provides for a closed seal when secured to the plastic or other material of the heat pipe tube.

The end caps must be secured to the heat pipes, as stated above, so as to result in a sealed, closed system for the second heat transfer fluid in the heat pipe tube. This may be accomplished in many ways, for example, by molding or heat shrinking a plastic tube on the end caps or using other means, mechanical or chemical (e.g. adhesives) to secure the end caps to the plastic or other material of the heat pipe tubes. It should also be noted that the insertion of the heat pipe with metal end caps into the circulation pipe should be performed in such a way as to result in a seal between the heat pipe and the circulation pipe to prevent any leakage of the first heat transfer fluid from the circulation pipe, e.g., into the heat pipe. Again, this may be accomplished by any conventional mechanical or chemical means including molding and the use of conventional sealer material.

If the preferred plastic heat pipes are used, the plastic of the heat pipes may be any suitable polymeric material which resists corrosion from and is impervious to second heat transfer liquid and vapor within the heat pipes, such as high density polyethylene. Any number of heat pipes may be used in the disclosed system and such number would be governed by such factors as the size of the recirculation pipes, the rate of flow of the first heat transfer fluid being passed by the heat transfer surfaces, the size of the dwelling being heated or cooled and other such general thermodynamic considerations within the purview of one skilled in the art. Preferably, the greatest efficiency can be achieved with two to four heat pipes per linear foot of circulation pipe. And as mentioned above, the second heat transfer liquid and vapor may be any material or combination of materials which will vaporize and condense around the working temperatures of the heat pipes at pressures near atmospheric pressure, which temperatures will vary depending on the temperature of the earth at the locality in which the system is used. The temperature of the earth in most locations revolves around 55° F. (about 12.8° C.) and thus the particular second heat transfer fluid will be chosen with this temperature factor in mind. It should also be noted that while the first and second heat transfer fluids are preferably different materials, they can be the same heat transfer material.

In selecting a second heat transfer fluid, it is preferred that the second heat transfer fluid have a vapor pressure at or near atmospheric pressure (14.7 psi) at temperatures between about 30 and 100° F. Freon ® 11 ($CCl_3F$) (E. I. du Pont de Nemours, Inc.) is such a heat transfer fluid which was used as the second heat transfer fluid in the system of the figures. Second heat transfer fluids with such properties will work effectively over all ground conditions in which the system will be used. If the vapor pressure of the second heat transfer fluid over the 30–100° F. temperature range is too far below atmospheric, the velocity of the vaporized second heat transfer fluid would have to be impracticably high in order to transfer sufficient quantities of heat for an operable system. Similarly, if the vapor pressure of the second heat transfer fluid is too high over this temperature range, the structure to contain the second heat transfer fluid would have to be of such size and strength as to be impractical.

It is also important that there be sufficient liquid second heat transfer fluid in the heat pipes that even when operating in the most efficient mode where the liquid second heat transfer fluid is present and condensing along the walls of the heat pipe along the entire length of the heat pipe tube that there still be liquid second heat transfer fluid present in the tube in contact with the lower end cap such that continuous evaporation and condensation can take place.

Since the temperature of the earth in most locations where this system will be used is about 55° F., in one embodiment of the system when it is operating in its heating mode a second heat transfer fluid can be used in the heat pipe having a boiling point not exceeding 55° at the vapor pressure conditions prevalent in the heat pipe under actual operating conditions, which in most cases, as indicated above, will be at or near atmospheric pressure.

In the specific system shown by FIG. 1, Freon 11 was used as the second heat transfer fluid in the heat pipe. The heat pipe of this figure was high density polyethylene 5 feet long with an outer diameter of 1 inch, and a wall thickness of 0.008 inch. In this particular example the Freon was present in sufficient amount so as to completely fill the lower end cap prior to start up of the system.

FIG. 2 demonstrates the operation of the heat pipe in the air-conditioning or gound heat sink mode. In such mode, the upper circulation pipe 2 of FIG. 1 is closed off so that only the lower circulation pipe 6 of FIG. 1 would be in operation. Accordingly, the first heat transfer fluid, for example, water, as it comes from the heat pump unit in a warmed condition having absorbed heat from the unit, passes by lower end cap 8 giving off the heat energy to such end cap operating in a boiler mode. The first heat transfer fluid continues on in a cooled state having given off such heat energy and causes the second heat transfer fluid 9, for example, Freon 11, to move up the heat pipe as a vapor 10 until it reaches points along the walls of the heat pipe 4 where it condenses giving off heat to the earth by virtue of the cooler temperatures of the ground surrounding the heat pipe (such heat out indicated as 11). The condensed second heat transfer fluid 12 continues back down the heat pipe 4 returning as a liquid 9 to be vaporized once again by the end cap functioning as a boiler 8 heated by the passing of first heat transfer fluid 13.

In FIG. 3, the reverse cycle is demonstrated. In this, the heating mode of operation of the heat pipe system, the first heat transfer fluid, for example water designated as 14, cools the end cap functioning as a condenser 3, causing the vaporized second heat transfer fluid 10 to condense on the end cap 3 by virtue of the temperature difference of the vapor and metal end cap. The first heat transfer fluid having given off its heat to the heat pump to ultimately heat the residential dwelling or other building structure returns in a cooled state to flow by the end cap functioning as a condenser extracting heat energy from the vapors associated with the end cap condenser and continues on in a warmed state to return heat to the heat pump. The condensed vapors 12 return as a liquid down the heat pipe toward the pool 9 at the bottom of the heat pipe and are continually vaporized as vapors 10 along the walls of the heat pipe to be condensed on a continuing basis at the end cap functioning as a condenser 3. In this mode, heat is supplied by the earth to cause the initial vaporization of the condensed fluid 9. As stated above, the second heat transfer fluid must be chosen to match the temperature conditions prevalent at the earth site of operation of the heat pipe. In such cases, a vapor-liquid condition continually exists in the heat pipe system such that by virtue of whichever mode of operation is in use at the time, that is either the air-conditioning or heating mode, the imbalance caused to occur by virtue of the heating of the lower end caps functioning as boilers or cooling of the upper end caps functioning as condensers will cause the second heat transfer fluid system to tend toward equilibrium by virtue of the constant temperature of the earth surrounding the heat pipe system. Accordingly, no changing of fluids is necessary in the heat pipe system regardless of which mode is in operation and the mere shutting of valves to close off either the upper or lower recirculation pipes are all that is necessary to take advantage of the constant ground temperature and heating or cooling source continually present by virtue of the earth surrounding the heat pipes.

FIG. 4 is a vertical cross section demonstrating the preferred heat pipe design inside the plastic pipes 4 of FIG. 1. In this preferred embodiment cup-shaped ribs are designed into the plastic heat pipe to capture the condensed liquid 9 over the whole length of the heat pipes. The ribs span the entire circumference of the pipe. The ribs 15 in the pipe 4 may either be molded into the pipe or exist as a separate insert of a material, such as metal or plastic. The height of the walls of the cups indicated as 16, may also vary depending on the amount and properties of the second heat transfer fluid and can be as small as desired to the point of representing no more than corrugations.

Figure 5:
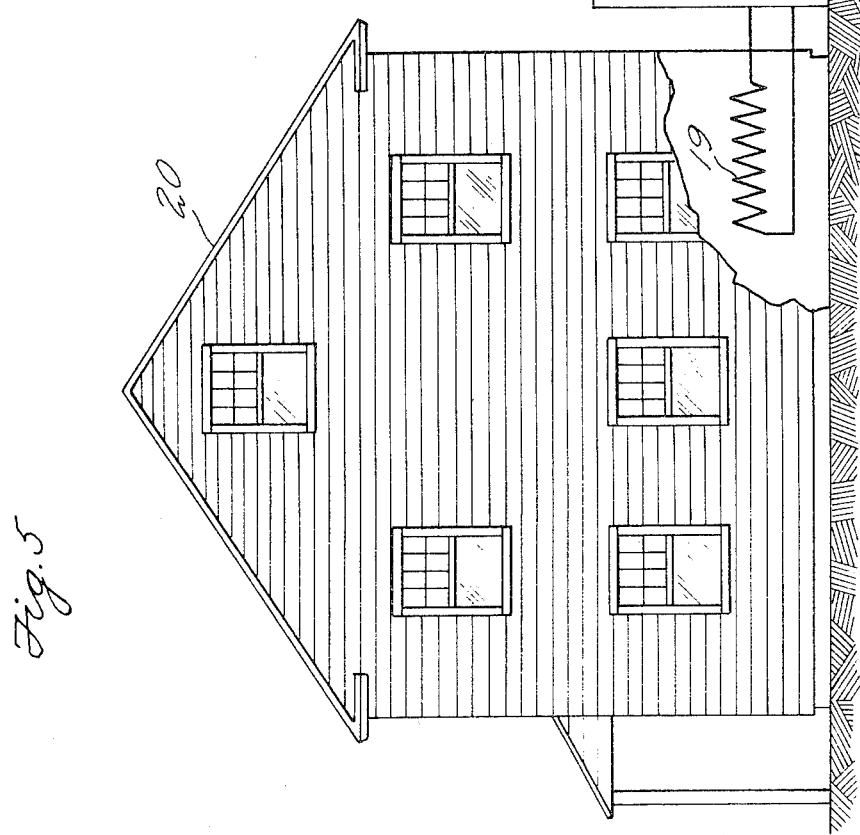
FIG. 5 illustrates the heat pipe system in use with a residential dwelling or other building structure.

FIG. 5 demonstrates schematically the heat pipe system 16 working in conjunction with a heat exchanger 17, a heat pump 18, and a dwelling heat exchanger 19, to heat or cool the dwelling 20. For such a system, the first heat transfer fluid circulates through the circulation pipes 21, 22 and 26, controlled by the valves 23 and 25, and driven by the pump 24. In the air-conditioning mode, valve 23 is closed and valve 25 opened restricting the flow of the first heat transfer fluid through circulation pipe 26. The heat which is absorbed by the first heat transfer fluid in the heat exchanger 17 is given up to the ground through the heat pipe system 16. Also in the air-conditioning mode, heat is absorbed by the dwelling heat exchanger 19 causing cooling of the dwelling and is given up in the heat exchanger 17 through the action of the heat pump 18. In the heating mode, valve 23 is open and valve 25 closed restricting the flow of the first heat transfer fluid through circulation pipe 22. Heat is absorbed from the ground through the heat pipe system 16 and is given up in the heat exchanger 17. Also, in the heating mode heat is absorbed in the heat exchanger 17 and is given up in the dwelling heat exchanger 19 through the action of the heat pump 18, causing heating of the dwelling.

From the drawings and the remainder of the disclosure, it can be seen that what has been invented is an efficient, simple heat pipe heating and cooling system with no moving parts utilizing gravity as the driving force for transferring and absorbing heat to and from the heat transfer fluids involved. Accordingly, not only is energy saved based on the lessened degree of heating and cooling required by the heat pump unit working in its heating and air-conditioning modes in the residential dwelling or other building structure, but energy is also saved by using gravity as the driving force in the heat pipe system. Furthermore, the same system can be used for either heating or cooling providing even greater simplicity. This clearly provides a myriad of advantages over conventional systems of the prior art (for example wick systems) which have countless problems.

Although this invention has been shown and described with respect to a preferred embodiment thereof, it should be understood by those skilled in the art that various changes and omission in the form and detail thereof may be made therein without departing from the spirit and scope of the invention.

Having thus described a typical embodiment of my invention, that which I cliam as new and desire to secure by Letters Patent of the United States is:

1. A dual cycle, gravity driven heat pipe system comprising upper and lower heat transfer fluid containing conduits connected by a series of gravity driven heat pipes, the ends of said heat pipes extending into substantially the entire internal diameter of said fluid containing conduits, the heat pipes containing a second heat transfer fluid in fluid isolation from the first heat transfer fluid and having a vapor pressure at or near atmospheric pressure at temperatures between about 30° F. and 100° F., said system buried in the ground below the frost line and connected to a heat pump system.

2. The heat pipe system of claim 1 wherein the heat pipes are plastic cylinders sealed at each end by hollow, metal end caps.

3. The heat pipe system of claim 1 wherein the heat pipes are substantially parallel to each other.

4. The heat pipe system of claims 1 or 3 wherein the heat pipes are substantially perpendicular to the heat transfer fluid conduits.

5. The heat pipe system of claim 2 wherein the plastic heat pipes contain corrugated ribs along the internal circumference of the plastic pipes.

6. The heat pipe system of claim 2 wherein the plastic heat pipes contain cup-shaped ribs along the internal circumference of the plastic heat pipe.

7. The heat pipe system of claim 2 wherein the plastic tube is high density polyethylene.

8. The heat pipe system of claim 2 wherein at least one metal end cap is aluminum.

9. The heat pipe system of claim 2 wherein at least one metal end cap is copper.

10. The heat pipe system of claims 1 or 2 wherein at least one heat transfer fluid is a fluorinated hydrocarbon.

11. The heat pipe system of claim 10 wherein the fluorinated hydrocarbon comprises $CCl_3F$.

12. The heat pipe system of claim 1 wherein the second heat transfer fluid is a fluorinated hydrocarbon.

13. The heat pipe system of claims 1 or 2 wherein the heat pipe is approximately five feet long, has an approximately one inch outer diameter, and the walls are approximately 0.008 inch thick.

14. The heat pipe system of claims 1 or 2 wherein there is sufficient liquid refrigerant in the heat pipes such that when there is liquid refrigerant condensate along the entire length of the heat pipe walls, there is still liquid refrigerant at the bottom of the heat pipe.

15. The heat pipe system of claims 1 or 2 wherein there are two to four heat pipes present per linear foot of circulation pipe.

16. A method of heating and cooling a building structure with a conventional heat pump circulation pipe system containing a first heat transfer fluid, the improvement comprising at least partially heating or cooling the heat transfer fluid in the circulation pipe by passing said fluid in a fluid circulation pipe of the apparatus of claims 1 or 2.

17. The method of claim 16 wherein the first heat transfer fluid is water or a mixture of water and ethylene-glycol.

* * * * *